No. 714,910.　　　　　　　　　　　　　　　　Patented Dec. 2, 1902.
H. C. ITTER.
CAR FENDER.
(Application filed Oct. 1, 1902.)
(No Model.)　　　　　　　　　　　　　　　　2 Sheets—Sheet 1.
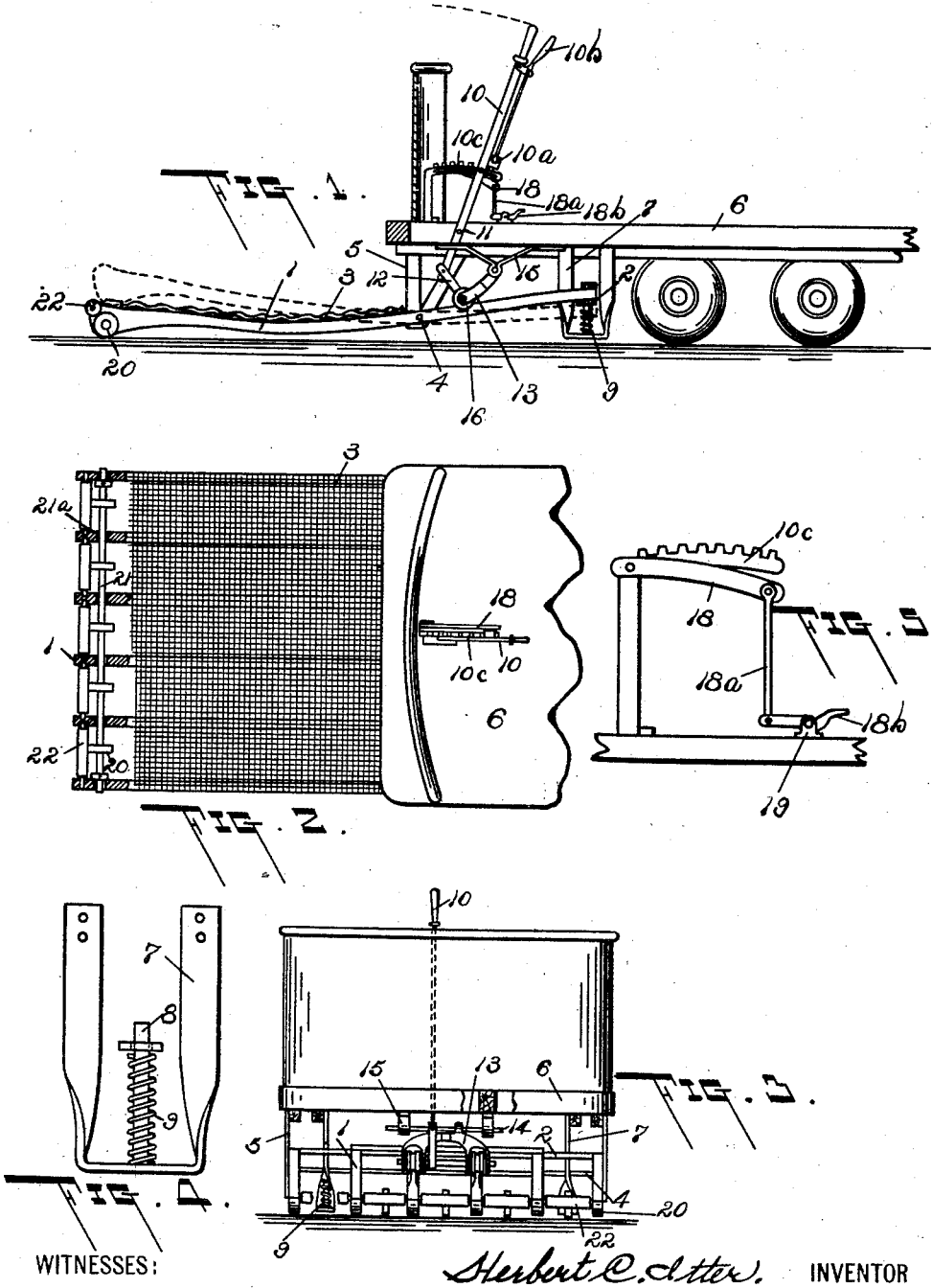
WITNESSES:　　　　　　Herbert C. Itter, INVENTOR
James C. Hanson　　　　　　　　BY
Frank Martindale　　　　Geo. B. Willcox, ATTORNEY
THE NORRIS PETERS CO., PHOTO-LITHO., WASHINGTON, D. C.

No. 714,910. Patented Dec. 2, 1902.
H. C. ITTER.
CAR FENDER.
(Application filed Oct. 1, 1902.)
(No Model.) 2 Sheets—Sheet 2.
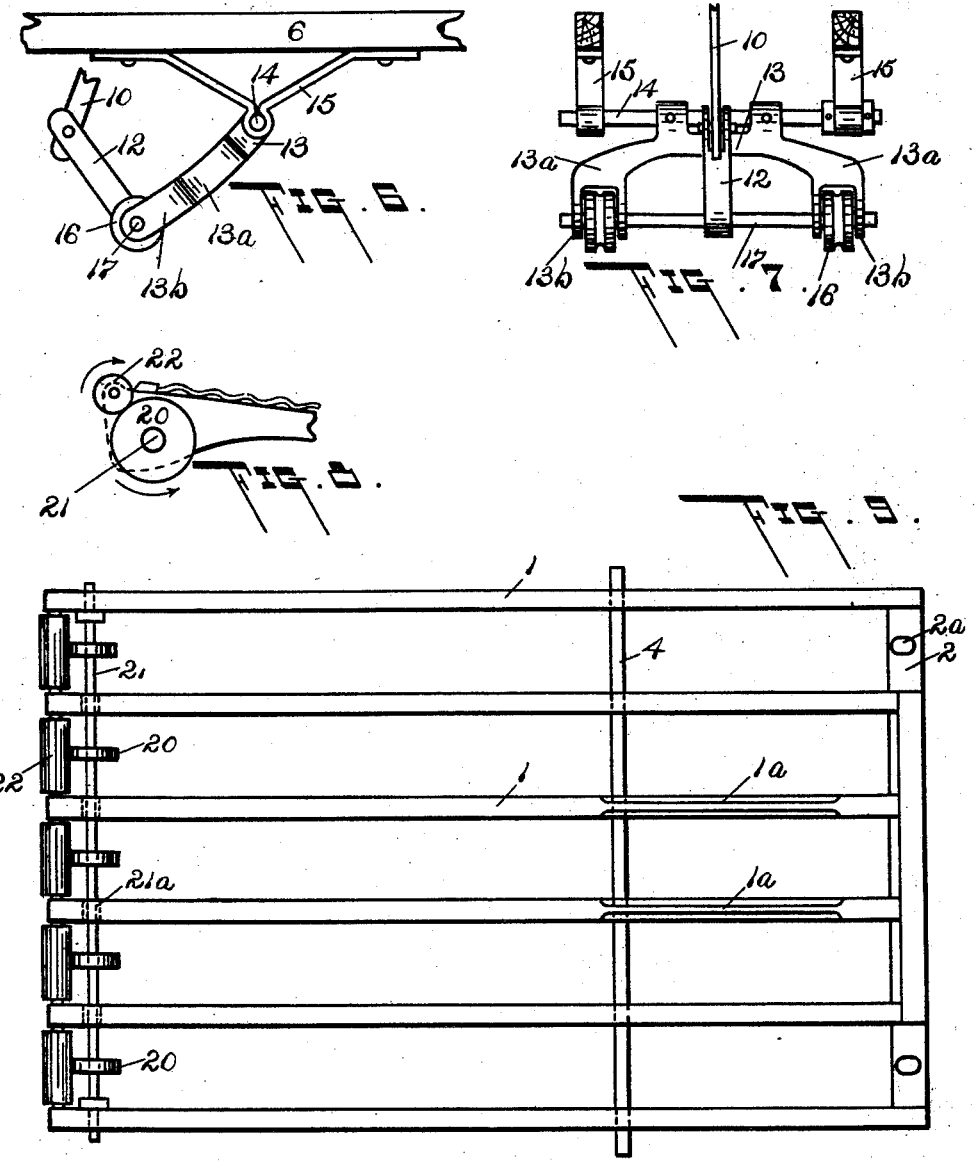

UNITED STATES PATENT OFFICE.

HERBERT C. ITTER, OF BAY CITY, MICHIGAN.

CAR-FENDER.

SPECIFICATION forming part of Letters Patent No. 714,910, dated December 2, 1902.

Application filed October 1, 1902. Serial No. 125,533. (No model.)

*To all whom it may concern:*

Be it known that I, HERBERT C. ITTER, a citizen of the United States, residing at Bay City, in the county of Bay and State of Michigan, have invented certain new and useful Improvements in Car-Fenders; and I do hereby declare the following to be a full, clear, and exact description of the invention, such as will enable others skilled in the art to which it appertains to make and use the same.

This invention relates to improvements in fenders for cars. It is a fender having at its front end wheels on a shaft and having in advance of these wheels short rollers that are oppositely rotated by frictional contact with the wheels. When in use, the fender-wheels are held to the pavement by springs carried on brackets attached to the car-body. When the fender is not in use, its forward end is lifted up against the action of the springs by means of a hand-lever connected by a toggle-joint to a pair of grooved wheels that roll along and press down upon two bars of the fender. To quickly drop the fender, I provide a foot-operated releasing device at the motorman's platform.

My invention is illustrated in the accompanying drawings, in which—

Figure 1 is a side view of the fender attached to a car-body. Fig. 2 is a top view of the fender broken away in part. Fig. 3 is a front view. Fig. 4 is a detail of the fender-operating spring and its bracket. Fig. 5 is a side view of the foot-operated releasing device. Fig. 6 is a detail of the yoke. Fig. 7 is a front view of the yoke. Fig. 8 is a detail showing the front end of the fender. Fig. 9 is a top view of the fender-frame.

The fender consists of a framework of parallel bars 1, connected by a cross-bar 2 and covered with wire-netting or other material 3. This framework is mounted on a shaft 4, which is suspended by brackets 5 from the car-body 6. A bracket 7, having a guide-rod 8, carrying a spring 9, is suspended from each side of the car-body at the back of the fender. The rear cross-bar 2 has elongated openings $2^a$, through which the guide-rod 8 passes, and the spring 9 expands between the rear cross-bar and the bracket 7 to drop and hold the front of the fender down when in use. To lift the front of the fender, a lever 10 is provided, mounted by means of a pivot 11 to the car-body. The lower end of the lever is connected by a link 12 to a yoke 13, pivotally suspended on a rod 14, supported by brackets 15 below the car-floor. This yoke has two laterally and forwardly extending arms $13^a$, having forked ends $13^b$. A grooved wheel 16, adapted to roll on one of the parallel bars of the framework, is mounted between each of the forked ends of the yoke on a rod 17. The upper edge of the bar is preferably beveled to receive the grooved wheel, as shown at $1^a$ of Fig. 9. The rod 17 also passes through the lower end of the link 12 and connects it to the yoke. The lever 10 has a latch $10^a$, operated by a handle $10^b$, and is guided by the quadrant $10^c$, having notches adapted to engage the latch $10^a$. A device is provided for releasing the lever by the foot, consisting in a false quadrant 18, pivoted to the quadrant $10^c$ at its front end and connected at the rear end by a link $18^a$ to the foot-lever $18^b$, pivotally mounted upon the floor of the car-body by a bracket 19. Stepping on the foot-lever lifts the false quadrant and raises the latch of the quadrant-lever out of the notches and so releases the lever, which swings backward and allows the fender-wheels to drop to the track.

To support the forward end of the fender, small wheels 20 are provided. These wheels are fixed to a shaft 21, having its bearings in the ends of the outside bars and passing through openings $21^a$ in the intermediate bars, so that all the wheels will turn if any one of them is made to revolve by contact with the rails or pavement. Short rollers 22, of rubber or other suitable material, are revolubly mounted between each pair of bars. These rollers are in frictional contact with the wheels 20 and are of such diameter as to make the circumference of the rollers the most forward part of the fender. The rolling of any one of the wheels 20 causes all the wheels to revolve, thereby revolving all the rollers in the opposite direction, so that anything struck by the fender will receive an upward impetus from the rollers and will be thrown upon the fender instead of being dragged beneath it.

By the means above described I have produced a fender for cars and other vehicles which is easily and quickly operated and provided with means for lifting an object to a position such that the fender may slide under it.

What I claim as my invention, and desire to secure by Letters Patent, is as follows:

1. A car-fender comprising a forwardly-extending framework pivotally suspended under the car-body; wheels mounted on the forward end of said framework; rollers pivotally mounted in front of and slightly above said wheels and in frictional contact therewith; springs bearing against the rear end of said framework to press it upwardly; a pivoted yoke carrying wheels adapted to roll on the bars of said framework to press its rear end downward; a link pivoted at its lower end to said yoke; a lever pivotally mounted on the car-body and having its lower end pivoted to the upper end of said link; a latch on said lever; a quadrant having notches to engage said latch; a pivotally-mounted false quadrant for raising said latch; and a lever and link for raising said false quadrant.

2. In combination with a car-fender; a yoke pivotally mounted on the car-body; grooved wheels carried by said yoke and adapted to roll on bars of the fender-frame; a lever connected to said yoke by a link; a notched quadrant; a latch on said lever adapted to engage the notches of said quadrant; and a false quadrant having a foot-lever for releasing said latch.

3. In combination with a car-fender; a yoke pivotally mounted on the car-body; wheels carried by said yoke and adapted to roll on bars of the fender-frame to depress the rear end of said frame; and springs operating against said frame to raise its rear end against the action of said wheels, substantially as described.

4. In a fender for cars and other vehicles having means for lifting the forward end of the fender and means for holding the forward end down to the ground; wheels fixed on a shaft having bearings at the sides of said fender and adapted to run on the ground; and short rollers whose circumference is in advance of all other points of said fender and which are in frictional contact with said wheels and adapted to be turned by them when they revolve.

In testimony whereof I affix my signature in presence of two witnesses.

HERBERT C. ITTER.

Witnesses:
P. M. HOLDSWORTH,
JAMES C. HANSON.